United States Patent Office

3,839,437
Patented Oct. 1, 1974

---

3,839,437
METHACRYLIC ACID MANUFACTURE
Ting-I Wang, Cherry Hill, N.J., and Harold Shalit, Drexel Hill, and John G. Zajacek, Strafford, Pa., assignors to Atlantic Richfield Company, Los Angeles, Calif.
No Drawing. Filed Dec. 22, 1972, Ser. No. 317,863
Int. Cl. C07c 51/26, 57/04
U.S. Cl. 260—530 N   2 Claims

ABSTRACT OF THE DISCLOSURE

Methacrolein is oxidized in the presence of a silver catalyst and aqueous calcium hydroxide to prepare calcium methacrylate. Thereafter, methacrylic acid is extracted by an organic solvent from an aqueous system containing calcium methacrylate, carbon dioxide, and calcium bicarbonate. Pressurized carbonic acid and/or superatmospheric carbon dioxide may be employed. Other alkaline earth hydroxides such as barium hydroxide may be employed instead of calcium hydroxide.

GENERAL BACKGROUND OF THE INVENTION

Field of invention

This invention relates to the oxidation of methacrolein to methacrylate acid and to the formation of methacrylic acid from aqueous solutions of methacrylate salts.

Prior art

Montagna et al., 2,887,496 and 2,930,801, describes methods featuring the oxidation of methacrolein to methacrylic acid in aqueous alkaline solution using a silver catalyst. The sodium methacrylate as produced is treated with acid such as sulfuric acid or hydrochloric acid to provide the desired methacrylic acid.

Manedjian et al., 3,579,572, describes a method in which pressurized carbon dioxide reacts with a solution of magnesium terephthalate or lithium terephthalate to precipitate the terephthalic acid and to provide an aqueous solution of the bicarbonate salt which is recycled for other steps in the terephthalic acid manufacture.

The demand for esters and acids having unsaturated groups, such as methacrylate acid, has been increasing significantly during the 18 years since the filing of the Montagna application. A significant variety of specialized applications for acrylate type polymers has led to a significant market for methacrylic acid. Notwithstanding the increasing demand for the inexpensive routes toward the preparation of methacrylic acid, and notwithstanding a variety of publications dealing with the synthesis of methacrylic acid, no solution has been found to the long-standing problem of achieving an inexpensive commercially attractive route for oxidizing methacrylaldehyde to methacrylic acid.

SUMMARY OF THE INVENTION

In accordance with the present invention, methacrolein is oxidized in an aqueous alkaline solution of an alkaline earth hydroxide such as calcium hydroxide, thereby forming a salt such as calcium methacrylate. In a second reaction zone, the aqueous solution of an alkaline earth methacrylate such as calcium methacrylate is subjected to carbon dioxide and to an organic extractant whereby the salt of methacrylic acid is converted to the acid by the reaction with carbon dioxide and the methacrylic acid is extracted from the aqueous system. The alkaline earth hydroxides conventionally employed in the synthesis of organic chemicals are the four members of the group consisting of magnesium hydroxide, calcium hydroxide, strontium hydroxide, and barium hydroxide.

DESCRIPTION OF PREFERRED EMBODIMENTS

The invention is further clarified by reference to a plurality of examples.

Examples 1–15

A saturated solution of calcium hydroxide in water containing about 1.6 grams of calcium hydroxide per liter is prepared and protected from the atmosphere and/or contact with carbon dioxide. The hydroxide concentration is of the magnitude of 0.4 normal and because of this high alkalinity, the pH measurement is of less significance, but between 13 and 14.

A silver catalyst was prepared by treating silver oxide with aqueous hydrogen peroxide followed by dispersion in the aqueous solution of calcium hydroxide.

A one liter three-neck glass round-bottom flask equipped with mechanical stirrer was adapted to permit the injection of oxygen gas, methacrolein at a controlled rate, and an aqueous solution of calcium hydroxide at a controlled rate. Initially, the flask was provided with a charge of 250 milliliters of the solution of calcium hydroxide containing the suspended silver catalyst. Then the injection of oxygen through the sintered glass diffusion disc was initiated at the rate of 30 liters per hour. During a period of about nine minutes about two grams of methacrolein were pumped into the solution at the rate of 0.267 milliliters per minute. Simultaneous with the addition of the methacrolein, 450 milliliter of the aqueous saturated solution of calcium hydroxide were added to the reaction mixture. Thereafter, the oxygen injection was continued for a controlled period of time.

In experiments 1–8, the amount of silver oxide employed was 0.15 mol or 34.65 grams. In Examples 9–15, only 11.55 gram or 0.05 mols of silver oxide was employed. It should be noted that the smaller amount was adequately effective for the reaction, the results being generally comparable to those for the previous examples. All of the preparations of Examples 1–15 were conducted at 0° C. The low temperature favors the catalytic conversion of the methacrolein selectively to methacrylic acid in the presence of the silver oxide catalyst and minimizes non-selective formation of by-products by thermal non-catalytic reactions.

The recovery of the methacrylic acid from the aqueous solution of calcium methacrylate was achieved by the combination of solvent extraction and acidification of the aqueous solution with carbon dioxide. A standard liquid-liquid extractor apparatus providing the efficient contact between the two immiscible liquids was employed for a controlled period of extraction time such as a day. The apparatus permitted the processing of a solution of about 350 milliliters containing about 0.175 mol of calcium methacrylate corresponding to a 0.5 molar calcium methacrylate solution. As the pH of the aqueous solution was shifted from alkaline to acid by the passage of carbon dioxide gas through the aqueous solution, the methacrylic acid was formed and calcium bicarbonate was formed. In a series of tests, it is established that any water immiscible organic solvent may be employed as the extractant. Certain advantages arise from use of an extractant having a boiling point below 200° C.

Examples of suitable extractants include benzene, ethyl ether, bischloroethyl ether, diisobutyl ketone and hexanoic acid or caproic acid. Using ethyl ether as the extractant, and continuing to add carbon dioxide to the aqueous system to assure aqueous saturation with carbon dioxide, the results of the extraction are as indicated in Table 1. Thus, the recovery of 98 percent of the methacrylic acid within a day was deemed to be evidence of the suitability of the extractant procedure.

In a control test to determine the effect of pressure upon the extraction step, it was established that using pressure apparatus, the residual amount of methacrylic soluble in the aqueous system was decreased by the increasing carbon dioxide pressure. At equilibrium between the benzene solvent and aqueous solution of calcium methacrylate at a concentration at about 0.5 mol per liter, and conducting the extraction for one hour, the equilibrium concentration of the methacrylate acid in the benzene layer was increased from 0.35 percent at 120 p.s.i.g. of carbon dioxide to 0.8 weight percent of the methacrylic acid in benzene at 320 p.s.i.g. of carbon dioxide. The one hour extraction represented the recovery of 3.6 percent of the methacrylic acid at 120 p.s.i.g. and 8.1 percent at 320 p.s.i.g. of carbon dioxide pressure.

Prior to the extraction of the methacrylic acid from the aqueous solution of calcium methacrylate, the silver catalyst was separated by filtration. Data concerning such methyacrylicacid preparation of Examples 1–15 and 16–24 are shown in Tables 2 and 3.

TABLE 1

| Extraction Time, Hours | Methacrylic Acid Recovery, Percent |
|---|---|
| 1 | 10.6 |
| 4 | 41.3 |
| 8 | 67.1 |
| 16 | 91.4 |
| 24 | 98.1 |
| 36 | 98.9 |

TABLE 2
Oxidation of methacrolein at 0° C.

| Example | Reaction time, min. | Methacrolein conv., Percent | Methacrylic acid yield, Percent |
|---|---|---|---|
| 1 | 5 | | 90 |
| 2 | 90 | 97 | 88 |
| 3 | 15 | 85 | |
| 4 | 60 | 98 | |
| 5 | 15 | 88 | |
| 6 | 15 | 76 | |
| 7 | 60 | 99 | 88 |
| 8 | 15 | 85 | |
| 9 | 15 | 90 | |
| 10 | 60 | 100 | 95 |
| 11 | 15 | 97 | |
| 12 | 15 | 85 | |
| 13 | 60 | 99 | |
| 14 | 15 | 83 | |
| 15 | 60 | 100 | 87 |

TABLE 3
Oxidation of methacrolein at 25° C.

| Example | Reaction time, min. | Methacrolein conv., Percent | Methacrylic acid yield, Percent |
|---|---|---|---|
| 16 | 15 | 100 | |
| 17 | 15 | 98 | |
| 18 | 60 | 100 | 92 |
| 19 | 15 | 98 | 84 |
| 20 | 15 | 98 | |
| 21 | 15 | 96 | |
| 22 | 15 | 92 | |
| 23 | 60 | | 79 |
| 24 | 15 | 93 | 82 |

TABLE 4
Oxidation of methacrolein with barium hydroxide at 40° C.

| Example | $Ba(OH)_2$, mole | Methacrylic acid yield, percent |
|---|---|---|
| 25 | 0.11 | 98 |
| 26 | 0.11 | 97 |
| 27 | 0.11 | 94 |
| 28 | 0.11 | 92 |
| 29 | 0.11 | 93 |

Examples 16–24

Using the smaller amount of catalyst of Examples 9–15, a series of preparations were conducted generally following the procedure of Examples 1–15 but conducting the oxidation and the mixing of the components at 25° C. instead of 0° C. Again, the conversions and yields were attractive, thus indicating that the use of calcium hydroxide in the oxiding of methacrolein to methacrylic acid represented a significant forward advance. The rejection mixture was acidified with carbon dioxide and solvent extracted with ether. The results of Examples 16–24 are shown in Table 3.

Examples 25–29

Using an aqueous solution containing about 0.15 mole silver oxide and about 0.5 normal barium hydroxide, and starting with about 200 milliliters of the solution in the flask and adding about 260 milliliters of the solution of barium hydroxide during the addition of the methacrolein, and adding the methacrolein during a period of about 10 minutes, followed by one hour of reaction with the oxygen flowing at the rate of 30 liters per hour, the methacrolein was oxidized to methacrylic acid. The extraction of the methacrylic acid from the aqueous solution of barium methacrylate was achieved using ether as the extractant, and adding carbon dioxide to the aqueous system during the extraction. As shown in Table 4 and the data for Examples 25–29, the yield of methacrylic acid was in a range indicative of a satisfactory oxidation reaction.

Various modifications of the invention are possible without departing from the scope of the appended claims.

We claim:
1. In the method of preparing methacrylic acid, wherein methacrolein is dispersed in an aqueous reaction mixture and an oxygen-containing gas is passed through the aqueous reaction mixture in the presence of a silver catalyst to convert the aldehyde to the corresponding acid, and wherein the acid is isolated from said aqueous reaction mixture, the improvement which comprises:
   including in the reaction mixture a quantity of calcium hydroxide in excess of that sufficient to form the metal salt of the acid;
   treating the reaction mixture resulting from the oxidation step at superatmospheric carbon dioxide pressure to a quantity of carbon dioxide sufficient to form a soluble calcium bicarbonate salt of all of the calcium ion derived from said calcium hydroxide, whereby the organic acid is formed from its calcium salt; and
   extracting the thus formed methacrylic acid by organic solvent extraction of said aqueous salt system, the presence of the superatmospheric carbon dioxide enhancing the transfer of the methacrylic acid to the organic solvent.
2. The method of claim 1 in which the amount of silver oxide is within a range from about 0.05 to about 0.15 moles of silver per 700 ml. of reaction mixture.

References Cited
UNITED STATES PATENTS
2,930,801    3/1960    Montagna et al. ___ 260—530 X FOREIGN PATENTS
1,055,229    1/1967    United Kingdom ___ 260—530 X LORRAINE A. WEINBERGER, Primary Examiner
R. D. KELLY, Assistant Examiner